(12) United States Patent
Pickford

(10) Patent No.: US 9,680,998 B2
(45) Date of Patent: *Jun. 13, 2017

(54) CALL CENTER SERVICES SYSTEM AND METHOD

(71) Applicant: Altisource Solutions S.à.r.l., Luxembourg (LU)

(72) Inventor: Dale Pickford, Wellington, FL (US)

(73) Assignee: Altisource Solutions S.àr.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,181

(22) Filed: Nov. 19, 2015

(65) Prior Publication Data
US 2016/0150086 A1    May 26, 2016

Related U.S. Application Data

(63) Continuation of application No. 14/257,418, filed on Apr. 21, 2014, now Pat. No. 9,225,835, which is a
(Continued)

(51) Int. Cl.
*H04M 3/42* (2006.01)
*H04M 3/51* (2006.01)
*H04M 3/523* (2006.01)

(52) U.S. Cl.
CPC ....... *H04M 3/5233* (2013.01); *H04M 3/5158* (2013.01); *H04M 3/5175* (2013.01);
(Continued)

(58) Field of Classification Search
CPC ............. H04M 3/5158; H04M 3/5233; H04M 3/5238; H04M 3/5235; H04M 3/5175;
(Continued)

(56) References Cited

U.S. PATENT DOCUMENTS

| 4,797,911 A | 1/1989 | Szlam et al. |
| 5,436,965 A | 7/1995 | Grossman et al. |

(Continued)

FOREIGN PATENT DOCUMENTS

WO    2012/142136    10/2012

OTHER PUBLICATIONS

U.S. Appl. No. 13/443,618, Final Office Action, Jun. 14, 2016.
(Continued)

*Primary Examiner* — Sonia Gay
(74) *Attorney, Agent, or Firm* — Meunier Carlin & Curfman LLC

(57) ABSTRACT

A method and system for providing automated call center services, operating by identifying a caller, accessing the caller's account information, determining the likely reason for the call, identifying an agent skill group based on the likely reason for the call, and providing an available agent with access to the caller's account information, together with a script based on the likely reason for the call. Data and voice access to agents is combined with specialized methods and systems for determining agent optimization capabilities, thereby allowing multiple call centers located in geographically different areas to operate as a seamless virtual call center, having the capability to dynamically reorganize the structure of available agents, regardless of where located. Real time statistics allow determination of how many agents should be available and what skill set those agents should have, thereby facilitating management decisions.

12 Claims, 10 Drawing Sheets

Related U.S. Application Data continuation of application No. 13/039,141, filed on Mar. 2, 2011, now Pat. No. 8,744,062, which is a continuation of application No. 11/141,209, filed on Jun. 1, 2005, now abandoned.

(60) Provisional application No. 60/611,717, filed on Sep. 22, 2004.

(52) U.S. Cl.
CPC ....... *H04M 3/5183* (2013.01); *H04M 3/5235* (2013.01); *H04M 3/5238* (2013.01); *H04M 3/42059* (2013.01); *H04M 3/42068* (2013.01); *H04M 3/5237* (2013.01); *H04M 2203/551* (2013.01)

(58) Field of Classification Search
CPC ........... H04M 3/5183; H04M 3/42059; H04M 3/42068; H04M 3/5237; G06Q 10/0639; G06Q 10/06398
See application file for complete search history.

(56) References Cited

U.S. PATENT DOCUMENTS

| | | | |
|---|---|---|---|
| 5,594,638 A | 1/1997 | Iliff | |
| 5,737,726 A | 4/1998 | Cameron et al. | |
| 5,822,400 A * | 10/1998 | Smith | H04M 3/5158 379/210.01 |
| 5,825,869 A * | 10/1998 | Brooks | H04M 3/5233 379/265.12 |
| 5,887,253 A | 3/1999 | O'Neil et al. | |
| 5,889,799 A | 3/1999 | Grossman et al. | |
| 5,960,073 A | 9/1999 | Kikinis et al. | |
| 6,098,052 A | 8/2000 | Kosiba et al. | |
| 6,163,607 A * | 12/2000 | Bogart | H04M 3/5233 379/265.02 |
| 6,195,426 B1 | 2/2001 | Bolduc et al. | |
| 6,453,299 B1 | 9/2002 | Wendkos | |
| 6,574,605 B1 * | 6/2003 | Sanders | G06Q 10/063112 379/265.01 |
| 6,587,556 B1 | 7/2003 | Judkins et al. | |
| 6,603,852 B2 | 8/2003 | Saito et al. | |
| 6,639,982 B1 | 10/2003 | Stuart et al. | |
| 6,763,104 B1 | 7/2004 | Judkins et al. | |
| 6,782,091 B1 | 8/2004 | Dunning | |
| 6,798,876 B1 | 9/2004 | Bala | |
| 6,819,759 B1 | 11/2004 | Khuc et al. | |
| 6,912,272 B2 | 6/2005 | Kirk et al. | |
| 7,072,966 B1 * | 7/2006 | Benjamin | H04M 3/5233 379/265.12 |
| 7,103,562 B2 | 9/2006 | Kosiba et al. | |
| 7,158,628 B2 | 1/2007 | McConnell et al. | |
| 7,191,150 B1 | 3/2007 | Shao et al. | |
| 7,203,285 B2 | 4/2007 | Blair | |
| 7,386,467 B2 | 6/2008 | Eitel et al. | |
| 7,472,089 B2 | 12/2008 | Hu et al. | |
| 7,546,262 B1 | 6/2009 | Ferguson et al. | |
| 7,558,756 B1 | 7/2009 | Wesly et al. | |
| 7,630,986 B1 | 12/2009 | Herz et al. | |
| 7,680,728 B2 | 3/2010 | Lazerson | |
| 7,742,980 B1 | 6/2010 | Klein | |
| 8,117,117 B2 | 2/2012 | Hu et al. | |
| 8,238,541 B1 * | 8/2012 | Kalavar | H04M 3/5175 379/265.06 |
| 8,326,748 B1 | 12/2012 | Klein | |
| 8,458,074 B2 | 6/2013 | Showalter | |
| 8,473,391 B2 | 6/2013 | Erbey et al. | |
| 8,489,498 B1 | 7/2013 | Flaxman et al. | |
| 8,521,631 B2 | 8/2013 | Abrahams et al. | |
| 8,595,130 B2 | 11/2013 | Johnson et al. | |
| 8,600,876 B2 | 12/2013 | Smith et al. | |
| 8,620,725 B2 | 12/2013 | Neuweg et al. | |
| 8,755,510 B2 | 6/2014 | Erbey et al. | |
| 2001/0040892 A1 | 11/2001 | Spencer | |
| 2001/0054064 A1 | 12/2001 | Kannan | |
| 2002/0009190 A1 | 1/2002 | McIlwaine et al. | |
| 2002/0022986 A1 | 2/2002 | Coker et al. | |
| 2002/0152288 A1 | 10/2002 | Hora et al. | |
| 2003/0078881 A1 | 4/2003 | Elliott et al. | |
| 2003/0086557 A1 | 5/2003 | Shambaugh et al. | |
| 2003/0131075 A1 | 7/2003 | Bear et al. | |
| 2003/0179877 A1 * | 9/2003 | Dezonno | H04M 3/51 379/266.07 |
| 2003/0190021 A1 | 10/2003 | Hornsby | |
| 2004/0010431 A1 * | 1/2004 | Thomas | G06Q 10/06311 705/7.13 |
| 2004/0015425 A1 | 1/2004 | O'Neill | |
| 2004/0042611 A1 | 3/2004 | Power et al. | |
| 2004/0042612 A1 | 3/2004 | Michelson et al. | |
| 2004/0059596 A1 | 3/2004 | Vaidyanathan et al. | |
| 2004/0062364 A1 | 4/2004 | Dezonno et al. | |
| 2004/0109557 A1 | 6/2004 | Lenard | |
| 2004/0162773 A1 | 8/2004 | Del Rey et al. | |
| 2004/0170258 A1 | 9/2004 | Levin et al. | |
| 2004/0234065 A1 | 11/2004 | Anderson | |
| 2005/0053224 A1 | 3/2005 | Pennington et al. | |
| 2005/0149418 A1 | 7/2005 | Erbey et al. | |
| 2005/0160142 A1 | 7/2005 | Whitman, Jr. | |
| 2005/0195961 A1 | 9/2005 | Pasquale et al. | |
| 2006/0023866 A1 * | 2/2006 | Dezonno | H04M 3/5183 379/265.09 |
| 2006/0062376 A1 | 3/2006 | Pickford | |
| 2006/0072739 A1 | 4/2006 | Baggenstoss et al. | |
| 2006/0095273 A1 | 5/2006 | Montvay et al. | |
| 2006/0179011 A1 | 8/2006 | Latz | |
| 2006/0287949 A1 | 12/2006 | Silverman | |
| 2007/0043661 A1 | 2/2007 | Kass et al. | |
| 2008/0244091 A1 | 10/2008 | Moore et al. | |
| 2009/0132365 A1 | 5/2009 | Gruenhagen et al. | |
| 2009/0171668 A1 | 7/2009 | Sneyders et al. | |
| 2010/0324966 A1 | 12/2010 | Neuweg et al. | |
| 2011/0060671 A1 | 3/2011 | Erbey et al. | |
| 2011/0208660 A1 | 8/2011 | Erbey et al. | |
| 2013/0346131 A1 | 12/2013 | Erbey et al. | |

OTHER PUBLICATIONS

U.S. Appl. No. 14/485,160, Final Office Action, dated Jul. 6, 2016.
U.S. Appl. No. 14/485,160, Final Office Action, dated Feb. 8, 2016.
"Call Center Demos," Database Systems Corp. Call Center Technology, http://www.databasesystemscorp.com/demonstrations.htm, 2005.
Gdovic, B., "Calling All Customers," Bank Marketing, Washington, vol. 33, Issue 4, 2001, 5 pages.
James Swann, "Making the connection: How technology integrates call centers," Community Banker. Washington: Jul. 2003. vol. 12, Issue 7; p. 34 [ISSN/ISBN: 15291332 and ProQuest document ID: 370884771].
Knowledge Center: Product Papers: Mortgage Industry, http://www.extservice.com/Knowledge Center.htm.
Bruno "Buying Q-Up Puts S1 Tops in NT Systems with its latest buy. S1 Corp. is setting its sights on the small bank market." Bank Technology News. New York: May 8, 2000. vol. 14, Issue 5; p. 33.
Davids "How to avoid the 10 biggest mistakes in CRM"; The Journal of Business Strategy. Boston: Nov./Dec. 1999. vol. 20, Issue 6; p. 22, 5 pgs.
New Century Mortgage Combines Contact Center Solutions for Maximized Performance, http://www/contacenterworld.com/news.asp?request=1&NewsItemID=(5F104E03 . . . 2004.
Owen, "Animal Instincts . . . can improve collections results", Credit Management, 2007.
PCT/US2012/033089, International Preliminary Report on Patentability and Written Opinion, dated Oct. 15, 2013.
PCT/US2012/033089, International Search Report, dated Jul. 17, 2012.
PCT/US2012/33089, Written Opinion of the International Searching Authority, dated Jul. 17, 2012.
Prabhaker, Paul R.; Sheehan, Michael J.; Copped, John I. The Power

(56) References Cited

OTHER PUBLICATIONS of Technology in Business Selling: Call Centers, The Journal of Business & Industrial Marketing. Santa Barbera: 1997. vol. 12, Issue 3/4; p. 222.
Related Case—U.S. Appl. No. 12/731,888, filed Mar. 25, 2010, entitled Method and System for an Integrated Approach to Collections Cycle Optimization. [Now published and listed above, and Issued as U.S. Pat. No. 8,473,391.
Related Case—U.S. Appl. No. 13/035,859, filed Feb. 25, 2011, entitled "Methods and Systems for Providing Customer Relations Information," now Publication No. 20110208660. [Now issued and listed above, as U.S. Pat. No. 8,755,510].
Simpson, B., A not-so-simple labor market. Credit Card Management, vol. 14, No. 8, retrieved Mar. 29, 2013, 2001, pp. 52-60.
Trevor Thomas "CRM systems help analyze workflow, profile customers," National Underwriter. (Life, health/ financial services ed.). Erlanger: Oct. 21, 2002. vol. 106, Issue 42; p. 11, 2pgs.
U.S. Appl. No. 10/918,699, Final Office Action, Jan. 4, 2006.
U.S. Appl. No. 10/918,699, Final Office Action, Nov. 16, 2007.
U.S. Appl. No. 10/918,699, Final Office Action, Oct. 4, 2006.
U.S. Appl. No. 10/918,699, Office Action, dated Apr. 21, 2006.
U.S. Appl. No. 10/918,699, Office Action, dated Aug. 19, 2005.
U.S. Appl. No. 10/918,699, Office Action, dated Aug. 25, 2010.
U.S. Appl. No. 10/918,699, Office Action, dated Jun. 25, 2007.
U.S. Appl. No. 12/731,888, Notice of Allowance, Apr. 9, 2013.
U.S. Appl. No. 12/731,888, Office Action, dated Dec. 23, 2011.
U.S. Appl. No. 12/731,888, Office Action, Oct. 22, 2012.
U.S. Appl. No. 12/731,888, Final Office Action, dated Aug. 1, 2012.
U.S. Appl. No. 13/035,859, Corrected Notice of Allowability, May 12, 2014.
U.S. Appl. No. 13/035,859, Notice of Allowance, Feb. 27, 2014.
U.S. Appl. No. 13/035,859, Office Action, Sep. 24, 2013.
U.S. Appl. No. 13/039,141, Notice of Allowance, Jan. 31, 2014.
U.S. Appl. No. 13/443,618, Final Office Action, Apr. 11, 2014.
U.S. Appl. No. 13/443,618, Non-Final Office Action, Oct. 9, 2015.
U.S. Appl. No. 13/923,601, Notice of Allowance, Jun. 17, 2014.
U.S. Appl. No. 13/923,601, Office Action, Jan. 6, 2014.
U.S. Appl. No. 14/257,418, Non-Final Office Action, Apr. 24, 2015.
U.S. Appl. No. 14/257,418, Notice of Allowance, Aug. 9, 2015.
U.S. Appl. No. 14/485,160, Non-Final Office Action, dated Apr. 7, 2015.
U.S. Appl. No. 14/485,160, Non-Final Office Action, Aug. 20, 2015.

\* cited by examiner

| SKILL GROUP | | | QUEUE STATUS | | SIGNED IN | AVAILABLE | NOT READY | AGENT STATUS ||||||
|---|---|---|---|---|---|---|---|---|---|---|---|---|---|
| LOCATION | UNIT | NAME | ID | IN QUEUE | ASA | | | | TALKING IN | TALKING OUT | TALKING OTHER/ DIALER | ON HOLD | RESERVED | BUSY |
| | | | 7336 | | | | | | | | | | | |
| | MORTGAGE | COLLECTIONS 30+ | 7339 | 0 | :04 | 3 | 0 | 0 | 2 | 0 | 0 | 1 | 0 | 0 |
| | | | 7397 | 0 | :00 | 0 | 0 | 0 | 0 | 0 | 0 | 0 | 0 | 0 |
| | MORTGAGE | BANKRUPTCY | 5922 | 0 | :03 | 4 | 3 | 0 | 1 | 0 | 0 | 0 | 0 | 0 |
| | | | 5117 | 1 | :22 | 5 | 0 | 2 | 3 | 0 | 0 | 0 | 0 | 0 |
| | MORTGAGE | CRD SUPERVISOR | 1871 | 4 | 01:17 | 14 | 0 | 0 | 13 | 0 | 1 | 0 | 0 | 0 |
| | | | 5007 | 0 | :09 | 3 | 1 | 1 | 1 | 0 | 0 | 0 | 0 | 0 |
| | MORTGAGE | COLLECTIONS 30+ | 5673 | 0 | :00 | 0 | 0 | 0 | 0 | 0 | 0 | 0 | 0 | 0 |
| | | | 6404 | 0 | :00 | 2 | 2 | 0 | 0 | 0 | 0 | 0 | 0 | 0 |
| | MORTGAGE | BANKRUPTCY | 7454 | 0 | :00 | 0 | 0 | 0 | 0 | 0 | 0 | 0 | 0 | 0 |

INBOUND CALL STATISTICS (REFRESH EVERY 15 SEC)

| START TIME | PLAY | DURATION | AGENT | DIALED FROM (ANI) | DIALED TO (DNIS) | EXTENSION |
|---|---|---|---|---|---|---|
| 4/15/2004 12:32:27.5 PM | | 00:01:02 | KOEL GUPTA | 7038210888 | 64512 | 64512 |
| 4/15/2004 12:32:01.0 PM | | 00:00:18 | | 5467 | 2050 | 5467 |
| 4/15/2004 12:31:55.0 PM | | 00:00:01 | | UNKNOWN | 64468 | 64468 |
| 4/15/2004 12:31:54.8 PM | | 00:01:02 | RAVIRAJ CHOKSI | 64521 | 4357 | 64521 |
| 4/15/2004 12:31:30.8 PM | | OPEN | | | | 0 |
| 4/15/2004 12:31:10.1 PM | | 00:00:23 | | 5460 | 916093849543 | 5460 |

FIG. 9

CALL CENTER SERVICES SYSTEM AND METHOD

CLAIM OF PRIORITY

This application is a continuation of U.S. patent application Ser. No. 14/257,418, titled "CALL CENTER SERVICES SYSTEM AND METHOD" filed Apr. 21, 2014, which is a continuation of U.S. patent application Ser. No. 13/039,141, titled "CALL CENTER SERVICES SYSTEM AND METHOD" filed Mar. 2, 2011, which is a continuation of U.S. patent application Ser. No. 11/141,209, titled "CALL CENTER SERVICES SYSTEM AND METHOD" filed on Jun. 1, 2005, now abandoned, which claims priority to U.S. Provisional Application Ser. No. 60/611,717 titled "CALL CENTER SERVICES SYSTEM AND METHOD" filed on Sep. 22, 2004. These applications in their entirety are incorporated herein by reference.

BACKGROUND OF THE INVENTION

Field of the Invention

The present invention relates to a method and system for providing call center distribution services.

Background of the Related Art

It is known in the telecommunications arts that automatic call distribution systems ("ACDs") are specialized types of telephone systems used in incoming call centers. A conventional ACD automatically answers incoming calls, places the calls in queues, provides information to callers based on software-implemented database handling instructions, routes callers to agents, and provides real-time, status and historical reports, which may be used for management and maintenance of call handling, call duration and call resources, as well as for training purposes.

In a traditional ACD environment, telephone calls are routed to multiple, geographically distributed ACDs, typically via use of a software routing program. The software directs the telephone network to send the call to a particular ACD agent skill group. Based on agent availability, status, and other factors, the ACD decides which agent within the group will receive the call.

An important feature of ACDs used in financial services organizations, such as banks, where many calls are received and handled by a plurality of agents, is the ability to have customer records displayed on an agent's terminal, simultaneously with the agent's responding to a call from the customer in question. The ACD transmits a customer identifier to a customer records database, which, in turn, displays the respective records on the selected agent's terminal at the time the call is transferred. It is increasingly difficult, therefore, in a distributed environment, in which callers, agents and/or supervisors are located in geographically different areas of the world, or in which calls are received over different networks, to accomplish all of the features of a conventional ACD, while still appearing to callers as a single seamless virtual entity.

There is thus a need for methods and systems to allow multiple ACDs, particularly when located in geographically different areas of the world, to operate as a single seamless virtual call center.

There is a further need for ACDs having the capability to dynamically reorganize the virtual organization of available individuals (interchangeably referred to herein as "agents"), so that those having the most relevant skill sets appropriate to respond to a call or query may be quickly and easily identified and accessed anywhere in the world, regardless of time of day.

There is a further need for methods and systems to allow such ACDs to utilize largely unskilled labor forces, yet to operate as effectively as the most experienced skilled workers within such centers.

There is a further need for methods and systems that allow such ACDs to intelligently respond to a caller's needs, by identifying a most relevant script set that may be related to the purpose of the call, and providing the script set to the agent as the call is put through.

There is a further need for methods and systems that allow optimization of integrated voice and data communications with expert knowledge in a seamless virtual ACD operation, while at the same time allowing easy integration with existing legacy call center platforms and networks, so as to allow a smooth migration to an Internet Protocol ("IP") infrastructure.

There is yet a further need to provide such methods and systems in a manner that dramatically reduces the costs of operation over conventional methods and systems.

SUMMARY OF THE INVENTION

The present invention solves the above identified needs, as well as others, by providing a method and system for multiple ACDs to operate as a seamless virtual call center by identifying agents worldwide, determining the availability status of each of the agents and each available agent's skill sets, determining the purpose and needs of a caller, matching the caller to the best available agent for the caller's purpose and needs, and identifying and providing to the agent the most relevant script set related to the caller's purpose and needs.

The present invention identifies agents by seamlessly joining the hardware and software for management of any number of locations containing agents via a central site or sites, such as a central server. In one embodiment, the seamless joining of the locations occurs for data and voice, the voice communication occurring via a telephonic system portion without utilizing traditional telephone systems (which do not permit such joining). In one embodiment, the electronic joining for the telephonic system portion occurs using Voice over Internet Protocol (VoIP) functionality, which allows central identification and access of all telephones or other terminals connected to a system, and determination of the status of each of these telephones at any time.

The present invention also combines such data and voice access of agents with specialized methods and systems for determining agent optimization capabilities. This combination allows determination of where agents connected to the system are located, as well as the availability status and the skill set for each of the agents. This information is then utilized in conjunction with information received about a caller, such as identification of the caller location, which is matched to caller account information, or via information obtained, for example, by interactive voice response/voice recognition unit (IVR/VRU), to allow the caller to be routed to the most appropriate available agent.

Determining agent optimization capabilities, in an embodiment of the present invention, involves use of a collection of software components that have been developed to operate together to load and utilize real time statistics. These software components allow determination of such information as how many agents are available, the skill sets of these available agents, and the current status of these agents, based, for example, on telephone system information. The determined information is used, in turn, to analyze such information as how many agents should be available (e.g., based on expected and/or actual call volume), what sets of skills and what number of agents having those skills should be available (e.g., based on expected and/or actual types of calls). This determination facilitates further management decisions with respect to the available agents (e.g., what agents with what skill types can be allowed to go on break at a given time).

In an embodiment of the present invention, the selection of the particular agent—amongst more than one available for a given need—may be made by the client (e.g., company or business unit using the system). For example, the agents may be prioritized based on relative workload or on a round robin basis. Each client may also set specific selection priorities, depending on how the client prefers to have the agents utilized. Variation can also occur based on the style of call an agent is logged in to take, or the skill set of the agent. Example criteria a client may use to determine selection priority for agents may include one or more of the following: availability; agent skill set (e.g., whether the agent has a single skill set or multiple skill sets); level of training and experience; and current and past productivity.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIG. 6 presents an example of a call campaign conducted for delinquent accounts in accordance with an embodiment of the present invention;

FIG. 8 presents example statistics provided by the Real-Time Messaging/Reporting module for use in conjunction with an embodiment of the present invention;

FIG. 9 presents an example graphic user interface of the Call Recording module for use in conjunction with an embodiment of the present invention.

DETAILED DESCRIPTION

The present invention provides multiple ACDs operating as a seamless virtual unit and featuring high quality customer interactions that optimize the integration of voice and data with expert knowledge within a single ACD environment. The essential features of exemplary embodiments of the invention are described in detail below.

Open System Architecture

Figure 1:
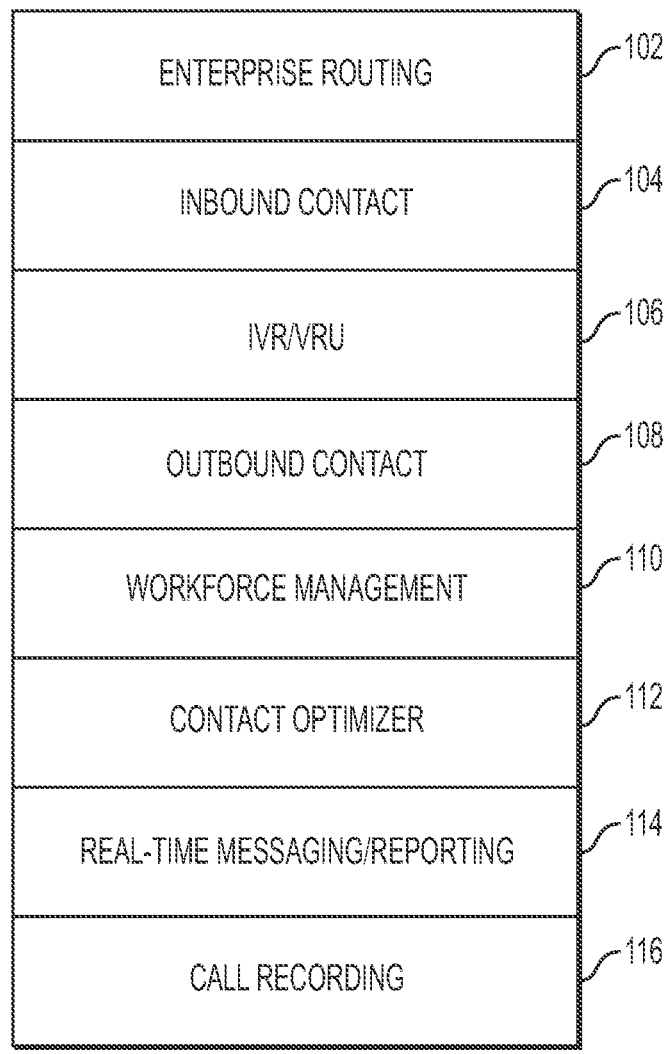
FIG. 1 shows an example open software and hardware architecture on which an embodiment of the present invention is based.

FIG. 1 shows an example open hardware and software system architecture 100, on which an embodiment of the seamless virtual ACD of the present invention is based. Enterprise Routing module 102 enables identification and precise routing of customer interactions. Enterprise Routing module 102 uses customer data, records and interaction history to make appropriate routing decisions. Further, Enterprise Routing module 102 delivers relevant customer information to a selected agent. Enterprise Routing module 102 centralizes ACD operations for an easy-to-administer, cost effective, multi-site solution.

Inbound contact module 104, in turn, delivers each incoming contact or call to the most appropriate global resource, identifying calls, for example, on the basis of the dialed number, calling line identification, or through caller-entered digits (e.g., credit card, customer identifier, or other information) and/or other IVR/VRU information.

The IVR/VRU module 106 may be fully integrated with conventional and Internet Protocol (IP) based ACDs to provide automated customer interaction and may be configured to optimize self-service IVR/VRU operations. IVR/VRU module 106 provides local prompt, collect and queuing services; provides a rapid script development ("RSD") tool; and empowers administrators to translate business rules and requirements into call handling instructions.

Outbound Contact module 108 provides outbound customer contact features directed to improving customer satisfaction, and may include a predictive dialer system. In one embodiment, Outbound Contact module 108 provides the following outbound call management features: preview, predictive, and precision dialing mode, pacing algorithms, live voice detections, and seamless verification.

Workforce Management module 110 is provided to reduce the complexity of agent staffing, to improve response times, and to increase agent and operational efficiency. In one embodiment, this module provides forecasts to determine the number of expected inbound calls, determines the number of agents necessary to support the predicted number of calls, prevents overstaffing of agents, tracks actual performance, compares resources to schedule, and makes interval adjustments.

Contact Optimizer module 112 tracks outbound call result history over time. In one embodiment, this module uses historical data to predict the best time to make outbound calls to each customer, thereby increasing productivity and profitability by decreasing long distance telecommunication charges and maximizing agent "log-on" time. Further, in an embodiment of the present invention, this module prioritizes individual account characteristics Time Messaging/Reporting module 114 enables real-time monitoring of the seamless virtual ACD of the present invention and provides real-time reports. In one embodiment, this module 114 provides real-time call center statistics related to characteristics such as the number of calls in a queue; the average speed of response; the longest call waiting time; and agent utilization.

Call Recording module 116 enables a uniform enterprise platform for recording and analysis, includes capturing and mining features, and automatically delivers data to decision-maker terminals. In one embodiment, this module provides performance statistics, monitoring, and call quality evaluation, provides real-time rules-based analyses and alerts, and captures, stores, analyzes, and manages transactions for compliance and risk management.

Operation Flow

Figure 2:
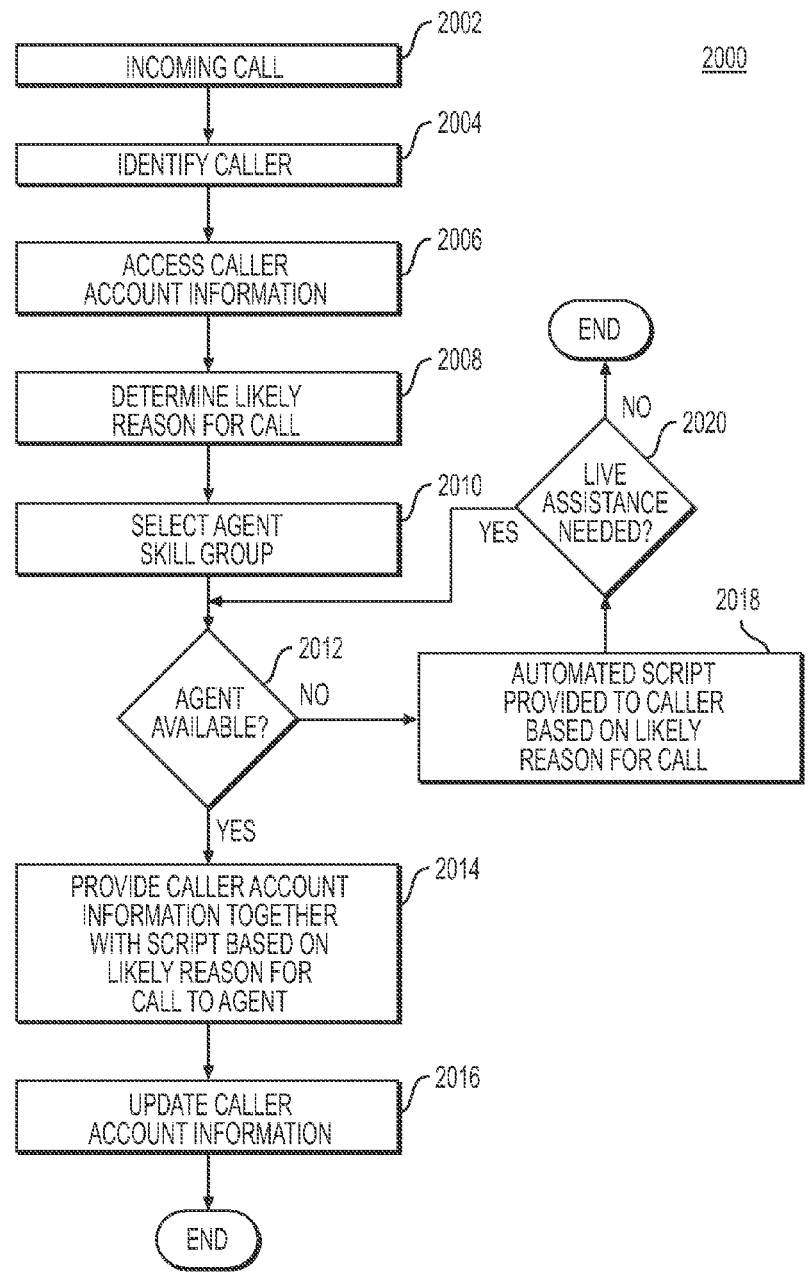
FIG. 2 presents an example flow diagram of functions performed in accordance with an embodiment of the present invention.

The operation flow 2000 of an embodiment of the present invention is shown in FIG. 2. In operation, once an incoming call 2002 is received, the caller is identified 2004 using, for example, the caller's telephone number or information input by the caller via IVR/VRU. Upon identifying the caller, the caller's account information is accessed 2006, and an evaluation is made as to the likely reason or reasons for the call 2008. In one embodiment, the likely reason for the call 2008 is determined automatically based on predetermined decision elements, rather than, for example, requiring the user to utilize IVR/VRU to determine the reason for the call.

The decision making process regarding the likely reason for the call 2008 may be based, for example, on recent account activity (e.g., account status change, value change) and may include consideration of such characteristics as the timing of the call (e.g., time of day, day of month), and previous activity history (e.g., has the caller called previously and, if so, to what did the call relate), among other characteristics.

Following a determination of the most likely reason for the call 2008, an appropriate group of agents 2010 with relevant skills for the likely reason for the call is identified and the caller is routed to that group. If an agent in the group is available 2012, the caller is routed to an available agent, and the caller's customer account in the system is accessed and presented to the agent's computer, along with a query script based on the pre-determined likely reason for the call 2014. In one embodiment, if the pre-determined likely reason for the call is not correct (e.g., determined in conversation between the caller and the agent, via use of the IVR/VRU or other user input), once the correct reason is identified, another script is provided to the agent based on the correct reason for the call. The agent then provides assistance to the caller, based on the provided script, and updates the caller's account information 2016, as necessary.

If an agent from the particular skill group is not available 2012, an automated script 2018 is provided to the caller based on the likely reason for the call. At the conclusion of the automated script 2018, which, in one embodiment, engages the IVR/VRU unit, if live assistance is nevertheless necessary 2020, the system will check whether an agent from the relevant skill group is available 2012.

Figure 3:
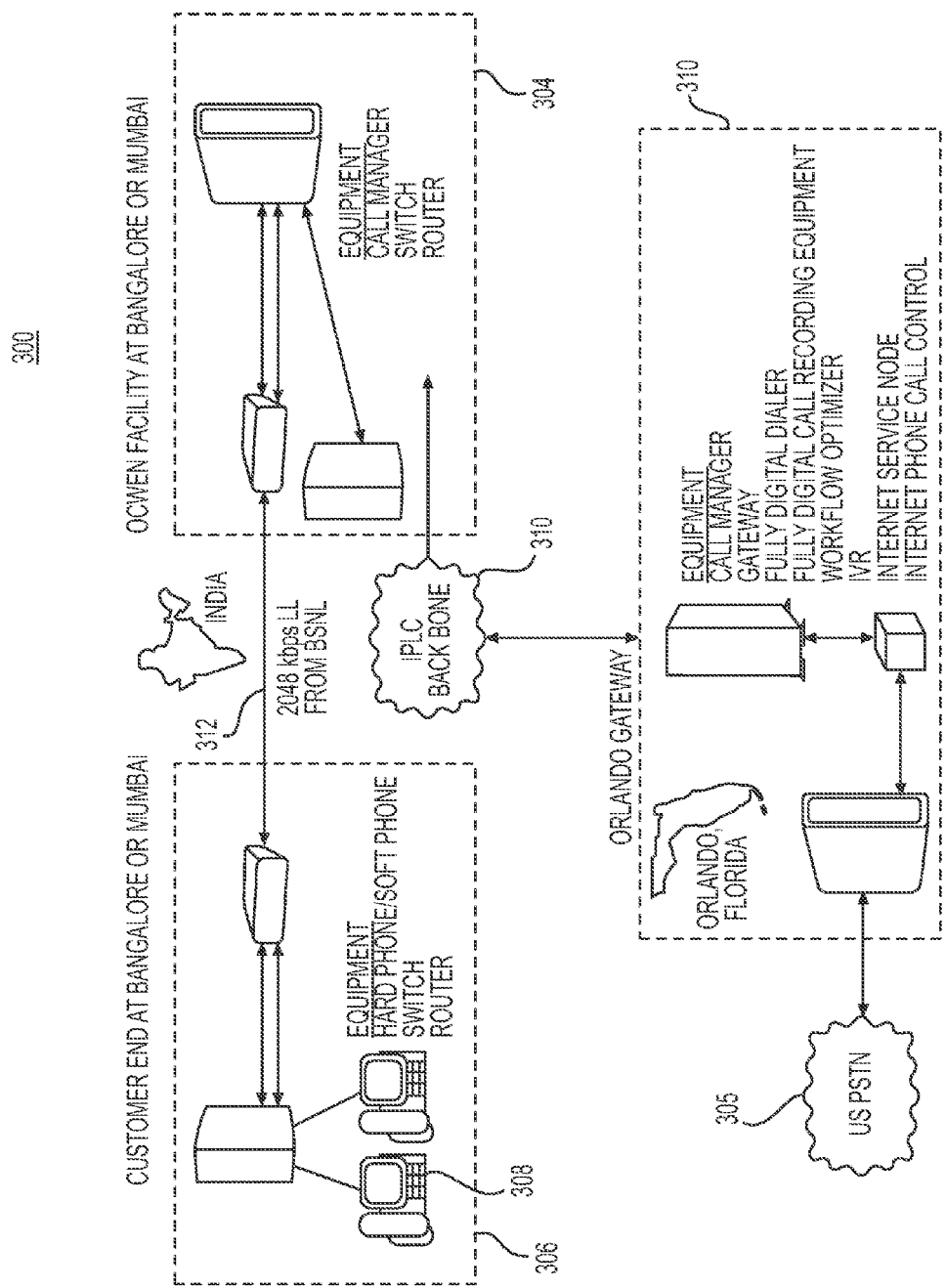
FIG. 3 presents an exemplary implementation architecture diagram including various hardware components and other features, in accordance with an embodiment of the present invention.

A hypothetical scenario will now be presented to further illustrate the process described above, using the exemplary implementation architecture diagram 300 depicted in FIG. 3. In this scenario, a Bank A customer in the United States receives a billing statement (e.g., a mortgage bill statement) that indicates that the customer's escrow withholding each month has just been increased by $150.00. A typical reaction to such an increase is for the customer to contact Bank A to determine why this increase has occurred.

Upon the caller at a telephone or other terminal initiating the call via a publicly switched telephone network ("PSTN") or other network 305, the call to one of Bank A's toll-free numbers is connected to the system operator's facility 302 located, for example, in Orlando, Fla. The caller's telephone number is used to identify the caller. In identifying the caller by the caller's telephone number, the system may, for example, compare the number to information in a repository (e.g., database) of home, work, mobile, or other telephone numbers, in turn, to attempt to match the user to a number. If no match is found, the caller may be requested (e.g., via IVR/VRU module) to provide identification information (e.g., name, account number or other identifier). Once the caller is identified, the customer's account is accessed (e.g., via access to a database or other repository of data, located and maintained, for example, at the system operator's facility 302).

Within the database, recent account activity may indicate, for example, that a billing statement has been recently mailed that includes a revised escrow calculation. Based on this recent activity, a determination is made that the likely reason for the call is a question about this activity. The call is then routed to a group of Bank A agents having the requisite skill level (e.g., with escrow accounts) via, for example, an International Private Leased Circuit ("IPLC") backbone 310. Upon determining that an available agent with the appropriate skill set is located in Mumbai, India, for example, the customer's call is routed to that available agent via the operator's communication system 304, located in India. The actual routing is accomplished by an Indian telecommunications provider 312 directly to the soft phone of the available one of Bank A's trained agents, which is coupled to the operator's communication system 304. Simultaneously with the call routing, the customer's account is accessed in Bank A's database, and a query script based on the recent change in the customer's escrow account calculation is located within Bank A's information repository (e.g., database).

When the agent receives the call, a popup window or other indicator appears on the agent's terminal 308 containing the caller's account information. Provided with the account information is an automatically generated script, based on the likely reason for the call, such as the following: "Good morning Mr./Ms. _____. You will have noticed on your current statement that your escrow withholding has been adjusted. Would you like me to explain how we calculate escrow withholding?"

An embodiment of the present invention utilizes an intelligent automated customer relations information system, such as the system described in applicants' copending U.S. patent application Ser. No. 13/035,859 titled "METHOD AND SYSTEMS FOR PROVIDING CUSTOMER RELATIONS INFORMATION" filed Feb. 25, 2011, which is hereby incorporated by reference (interchangeably referred to herein as the "CRE system"). Generally, upon receipt of account information and a query (e.g., keyword input), the CRE system's artificial intelligence-based automated scripting engine operates to provide the agent with a best response and/or script for responding, for example, to a customer inquiry.

The present invention operates in conjunction with systems such as the CRE system by utilizing a library of queries, from which a selection is triggered (predicted query) based on information in a customer's account (e.g., recent escrow amount change). The predicted question is then used to generate a best response from the automated query system (e.g., CRE system), and the predicted query and response are presented to an agent at the time of connection with the inquiring customer. Such predicted query and response may also be provided to the customer in an automated fashion, such as via IVR/VRU.

An embodiment of the present invention further includes recording features, such as call recording features that record the voice of the agent and the caller, and keystrokes and mouse movement recorders for recording such movements as made using the agent's keyboard and mouse. The recorded information is usable, for example, to replay agent verbal and keystroke responses, so that successes and failures can be reviewed and used for tutorial purposes. In an embodiment of the present invention, the lessons learned from the recorded information are used to provide continual feedback, such as for revising agent optimization information.

In an embodiment of the present invention, performance analysis for agents may include such information as the style of call handled (e.g., for a collection-type call, how many dollars per call the agent actually collects or how many dollars per call the agent receives as a promise to pay), average resolution time, and the number of times that a customer calls back with the same question (e.g., to determine effectiveness of the agent). This analysis may also be used to optimize the agents.

In an embodiment of the present invention, feedback occurs automatically among different components in the system. For example, the telephone system component may include a database or other repository of data that records the statistics for each call event (e.g., call length, which would presumably relate to length of time for resolution). The real time reporting information from the telephone system component is transmitted to other components, e.g. a component managing calls in a queue or a component for workforce management and optimization. From system components such as a loan servicing system component, information related to collection activity, the number of promises to pay, and the dollar amount of the promises, as recorded by the agent, may similarly be used in a feedback manner to influence the system's activity in real time or near real time.

Outbound Contact

Outbound contact module 108 shown in FIG. 1 is now described in more detail. This module provides features such as placing outbound calls (referred to interchangeably herein as "campaigns"), real-time maximization of the use of skilled agents, real-time effective management of telephony resources, and real-time display of statistical information, such as trunk, agent and campaign statistics, as well as other geographical information.

In an embodiment of the present invention, the Outbound Contact module may utilize four different dialing modes: predictive, preview, progressive "power dialing," and blended mode.

The predictive outbound dialing mode is a dedicated dialing mode that handles contacts by continually adjusting the number of call originations needed per agent to achieve near 100-percent agent utilization. This mode uses calculations of the average wait time and average handle time that agents are experiencing to adjust the number of call originations.

The preview outbound dialing mode enables the dialer to first reserve or "lock" an agent by placing a phantom call on the ACD. In this mode, a screen pops up on logged-in agents' desktop terminals, allowing the agents to dial, skip, or cancel the request.

The progressive power dialing mode enables campaign administrators to configure the dialing rate such that the Outbound Contact module does not attempt to predict the number of lines needed per agent and instead dials a set number of lines per agent. This number can be configured and set to a single line per agent. This feature guarantees that an agent will be available when a customer responds to a telephone contact.

The blended dialing mode enables delivery of both inbound and outbound (preview) calls to the same group of agents dynamically. Differing from the dedicated modes, blending enables an agent to switch between receipt of inbound and outbound calls on a call-by-call basis.

A feature of the Outbound Contact module in an embodiment of the present invention that enables call center managers to effectively administer and manage dialing campaigns is referred to herein as the "Campaign Management" feature.

Figure 4:
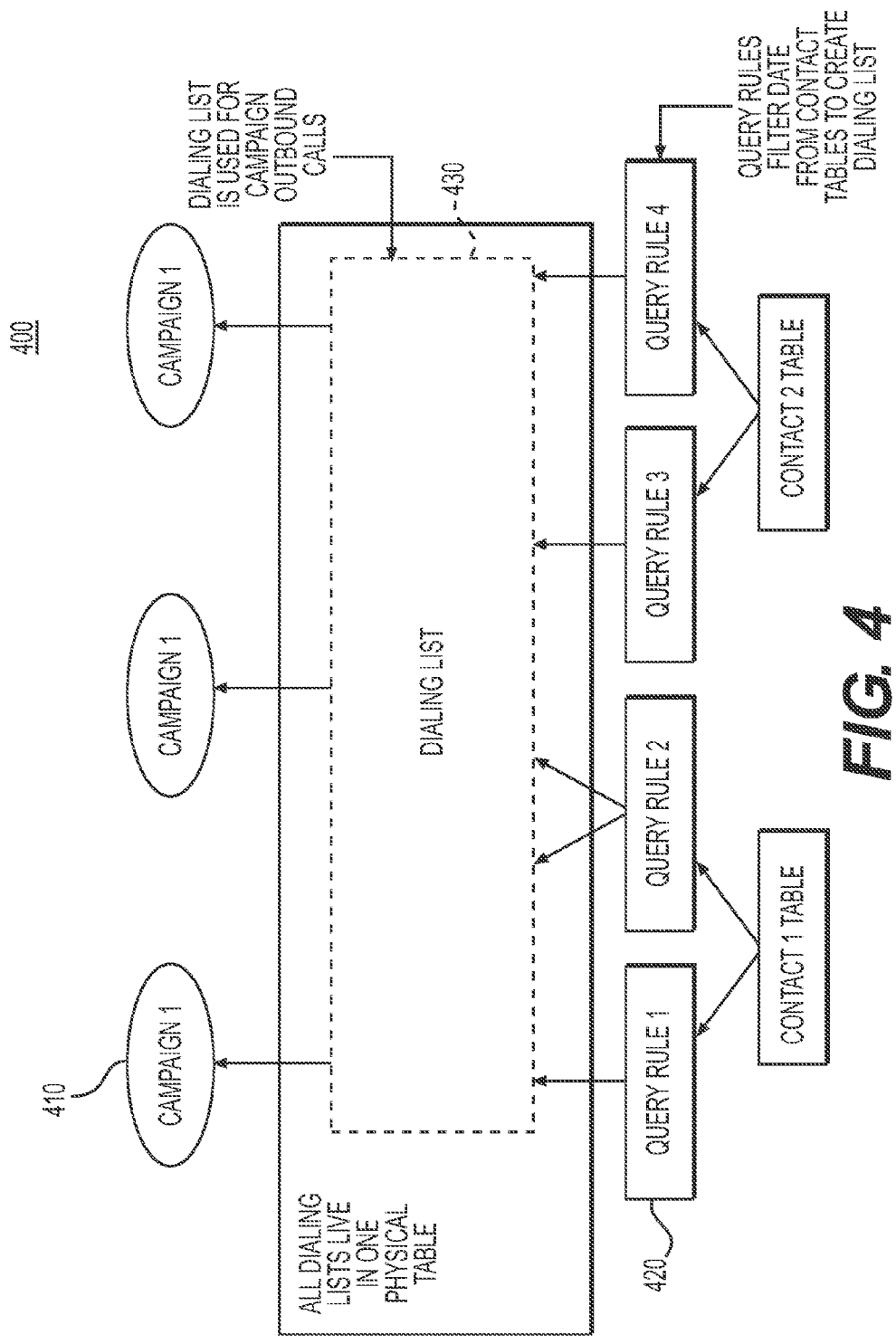
FIG. 4 shows the Campaign Management feature for use in conjunction with an embodiment of the present invention.

The Campaign Management feature 400, schematically depicted in FIG. 4, provides managers with the ability to configure campaigns 410, create query rules 420, and import dialing lists 430. Campaigns 410 can be configured to provide callbacks, which can be initiated based on the request of a party to be called back, or be automatically initiated by the system based on failure to contact a live party, for example. The personal callback feature provides an agent the ability to insert a record into the Dialing List table 430 for the customer or other party to be called at a later time. The agent can then enter, directly into the desktop application, the time and date information most convenient for that party to be contacted. The contact record is modified in the Dialing List table 430, indicating a telephone number to call and a time to place the call, thereby allowing the Outbound Contact module to offer the call to the specified agent at the designated time.

Another feature of the Outbound Contact module of an embodiment of the present invention is referred to herein as "Enhanced Call Progress Analysis." This feature provides the system with the capability to detect, for example automatically, the presence of an answering machine, facsimile machine, or modem. The Outbound Contact module accomplishes this capability in part by a high accuracy of active voice detection. Answering machine and/or modem detection call results are recorded in the Real-Time Messaging/Reporting unit, which tallies the types of responses detected during a campaign.

Yet another feature of the Outbound Contact module of an embodiment of the present invention is referred to herein as "Transfer to IVR/VRU." This feature enables pre-recorded IVR/VRU campaigns to be accomplished by providing the ability to play an automated message to a live caller from the IVR/VRU unit, or to leave pre-recorded messages on, for example, an answering machine. With answering machine or other recording detection enabled, live callers reached by the dialer can be connected to an agent and answering machines automatically directed to the IVR/VRU unit. This feature eliminates the occurrence of agents connecting to answering machines, thereby providing higher utilization of agent resources in the ACD.

A further feature of the Outbound Contact module in an embodiment of the present invention is referred to herein as the "Do Not Call" list. This feature provides the capability to add entries into a Do Not Call table. By eliminating calls that are in the Do Not Call table, for example, a higher call completion success rate is achieved.

Contact Optimizer

Figure 5:
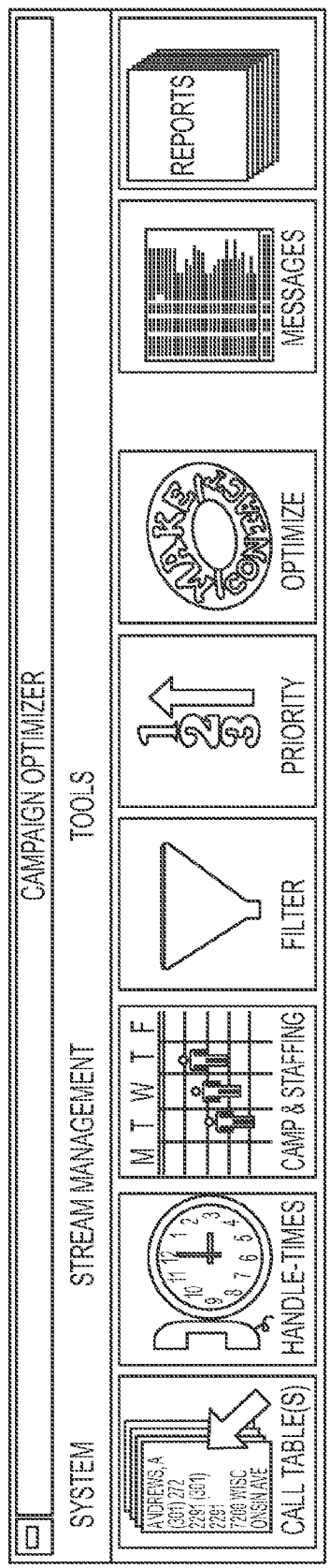
FIG. 5 presents the Contact (Campaign) Optimizer module for use in conjunction with an embodiment of the present invention.

Another component of the present invention (referred to interchangeably herein as the contact or campaign optimizer, for which an exemplary graphical user interface (GUI) screen portion is shown in FIG. 5) includes a dialer feature for calling customers or other parties to be called. In addition to predicting the best time to call each customer, the contact optimizer feature increases profitability and productivity by decreasing long distance telecommunication charges and maximizing agent log-on time. Dial "campaigns" are built based on such considerations as: 1) the best time to call a customer, based on account records (e.g., relying on account history, rather than just customer expressed preference); 2) the best dial sequence for initiating the contact (e.g., first home, second work, third mobile); and 3) the best way to contact the customer, given the style of the campaign.

Once the campaign is running, the campaign is fine-tuned based on feedback information, in order to optimize results. For example, a typical goal is raising the number correct party numbers contacted initially, which may be assumed to correlate to talking to the right person at the right time. Another factor is ensuring that a sufficient number of agents are available at all times. In addition to optimizing the campaign, the approach to the called party is optimized, such as by using the CRE system to focus on issues in the campaign of likely interest to that party (e.g., a recently increased escrow payment).

Figure 6:
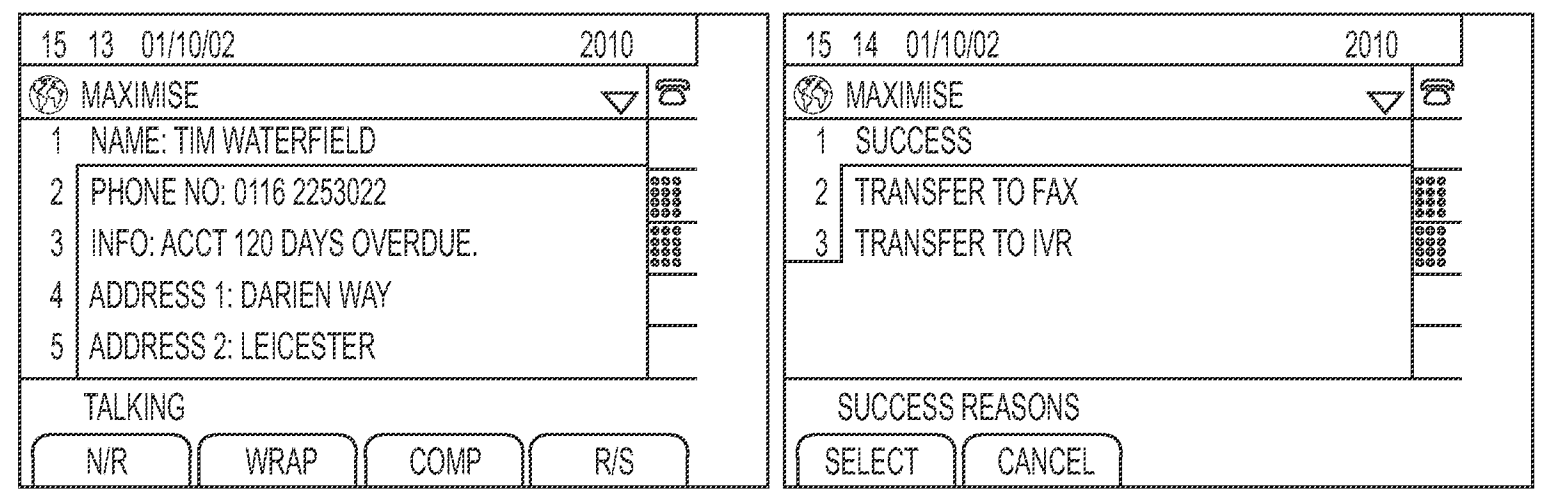

An example of various features of such a call campaign, shown in FIG. 6, involves triggering calls to customers upon accounts becoming delinquent. Initially, the contact optimizer of the present invention identifies or receives a list of customers that need to be contacted upon a predetermined event occurring (e.g., list of delinquent accounts today). Available agents with the necessary skills for the campaign (e.g., agents trained in collections) are then identified and connected, based on the determined priority for the agents, to called customers meeting the campaign requirements. Once a customer is connected, the agent receives a prompt generated from the campaign component (e.g., a prompt is provided to the agent based on the customer having a delinquent account).

The present invention has the capability to manage multiple campaigns and agents with multiple skills simultaneously. Thus, for example, an agent with multiple expertise areas may vary in campaign type selected, from call to call, depending on different points in the queue the agent falls and the campaign type for which the customer at that point in the queue is responding.

In embodiments of the present invention, determination of customers or other parties to be contacted during a campaign is determined via interaction with other linked systems or components, such as a servicing system or an unsecured collection system. For example, a linked or incorporated unsecured collection system may include a periodic database or other repository of data review that identifies all customers failing to make a monthly payment. This list of customers is extracted, evaluated for any other factors that could impact whether to contact the customer, and then each customer approved for contact is contacted via a dialer or other contact mechanism, in turn, and linked to an available agent, in accordance with the present invention.

In one embodiment, for example, the data for all accounts to be contacted is determined each evening, and delivered to the optimizer the following morning to determine optimal contact procedure. One embodiment of the optimizer of the present invention includes software based on VoIP, layered on top of the base hardware for VoIP. For example, in one embodiment, the optimizer software is designed for use with software made by Cisco Systems, Inc., of San Jose, Calif., which provides the base functionality for dialing operation. The invention is not intended to be limited to the Cisco Systems software disclosed, but may be used with any suitable software platform, as available from a number of vendors.

In operation, the combined dialing and base software receives the list of contacts to be made, and dials the contacts in a determined order, and based, for example, on optimized contact procedure for each contact. Once a call is answered, the present invention conferences a live agent, determined based on the agent priority portion of the system. In simple overview, for optimized calling campaigns, the present invention proceeds through the following determinations: 1) the first telephone number of the telephone numbers provided to be dialed for the contact; 2) the time of day, based on the selected style of account, that is optimal for contacting the contact at the telephone number identified; and 3) the appropriate agent routing using a workforce optimizer component (also interchangeably referred to herein as the "Workforce Management" component as described further below), and the specific agent to which each call is to be routed once a connection is made. Upon these steps being completed, an intelligent agent system or other component for assisting agent procedure, such as the CRE system and the generated prompts, is triggered (e.g., scripted prompts are provided to the agent based on the campaign issue involved).

In an embodiment of the present invention, the software and hardware for identifying contacts, optimizing contact procedure, optimizing agent selection, and supporting agent inquiry may be housed in a single location (e.g., single server) or housed in separate communicating locations (e.g., multiple servers on a network, such as the Internet). Agent access occurs, for example, via terminals (e.g., personal computers, telephones) coupled (e.g., via wired, wireless, or fiberoptic link) to the location or locations of the software and hardware. The software and hardware linking includes, for example, both data accessing systems and the VoIP operational features.

In operation, the VoIP system, for example, allows a terminal (e.g., computer or telephone) connection similar to a telephone switch, but operating via a network, such as the Internet. The VoIP system of one embodiment of the present invention is able to connect to the appropriate agent extension (e.g., of available agents) and provide operation as a function of information provided by a workforce management component, a contact optimizer, and a query or information engine, such as the CRE system. For example, if the step in the process (e.g., following connection to an identified customer) requires contact of an agent, the present invention utilizes its telephone system component (e.g., VoIP) and workforce management component to identify and connect to an available, prioritized agent with appropriate skills. The telephone component of the system then functions similarly to a telephone transfer, so as to connect the customer to the selected agent. The query and information engine component (e.g., CRE system) and servicing system component identify which terminal the agent is logged into, and, in one embodiment, both data and voice information travel to that terminal. The data the agent receives includes, for example, a selected script produced by the query and information engine component.

The determination of agent availability, in one embodiment, includes use of a system that determines agent login status. In one embodiment, the login terminal for the agent is matched to a corresponding telephone line for agent communication with the called or calling party. In another embodiment, telephone communication occurs via the terminal, and no separate matched telephone line is required. In one embodiment, the telephone communication via the terminal occurs using software, and the agent communicates via the terminal using, for example, a handset or headset.

In an embodiment of the present invention, the agents are located throughout the world, and agents are continually available somewhere in the world at all times. A centralized hardware and software location or centralized locations are used to communicate to the agents throughout the world. No separate call center at each location is required. The centralized approach further allows agents to operate at virtually unlimited numbers of locations, such as from each agent's home, as long as the agent is able to access a terminal communicating (e.g., for voice and data) with the centralized hardware and software.

In an embodiment of the present invention, multiple client agents (e.g., multiple agent sets based on multiple companies using the same centralized hardware and software for differing database information and calling subjects) and information and query system components are utilizable by the centralized hardware and software aspect of the system. Thus, for example, the centralized hardware and software discriminate each called or calling party based on the corresponding telephone number for the party calling or called, or alternatively for the number being called by that party (e.g., each client has a different business telephone number) and match the agents and CRE system information, depending on the client and need. For such multiple client agent applications, each client is able to select differing business rules, such as priority rules for selecting among available agents.

Workforce Management

Figure 7:
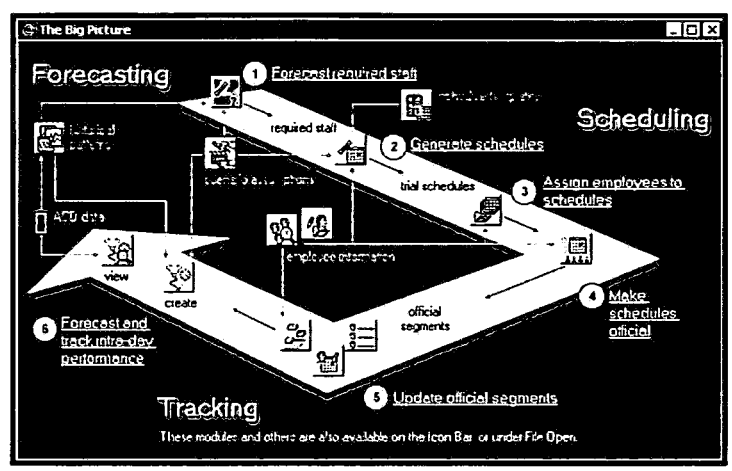
FIG. 7 shows the Workforce Management module for use in conjunction with an embodiment of the present invention.

Yet another module of an embodiment of the present invention, schematically depicted in FIG. 7 is referred to herein in some embodiments as the "Workforce Management" component. Based on ACD data, historical patterns and different scenario assumptions, this module provides forecasts to determine the number of expected inbound calls, determines the number of agents necessary to support the predicted number of calls, thereby preventing the overstaffing of agents, creates schedules and assigns agents to schedules, tracks actual performance, has the capability of taking quick corrective action, compares resources to schedules, and makes interval adjustments.

Real-Time Messaging/Reporting

The Real-Time Messaging/Reporting module of an embodiment of the present invention is a custom browser-based reporting portal that shows real-time ACD statistics across the enterprise. Example statistics that may be provided, as shown in FIG. 8, include, for a particular skill group of agents, the number and status of calls in the queue, the average speed of answer ("ASA") for each call, and the status of each agent in the particular skill group (e.g., signed-in, available, not ready, talking in, talking out, on hold).

Call Recording

An example GUI screen of the Call Recording module of an embodiment of the present invention is shown in FIG. 9. In one embodiment, this module provides performance statistics, monitors and evaluates call quality, optimizes agent performance, and increases agent retention. As shown in FIG. 9, for example, for each transaction, this module displays the start time, duration, handling agent, dialed from number, etc.

Hardware/Software Implementation

Figure 10:
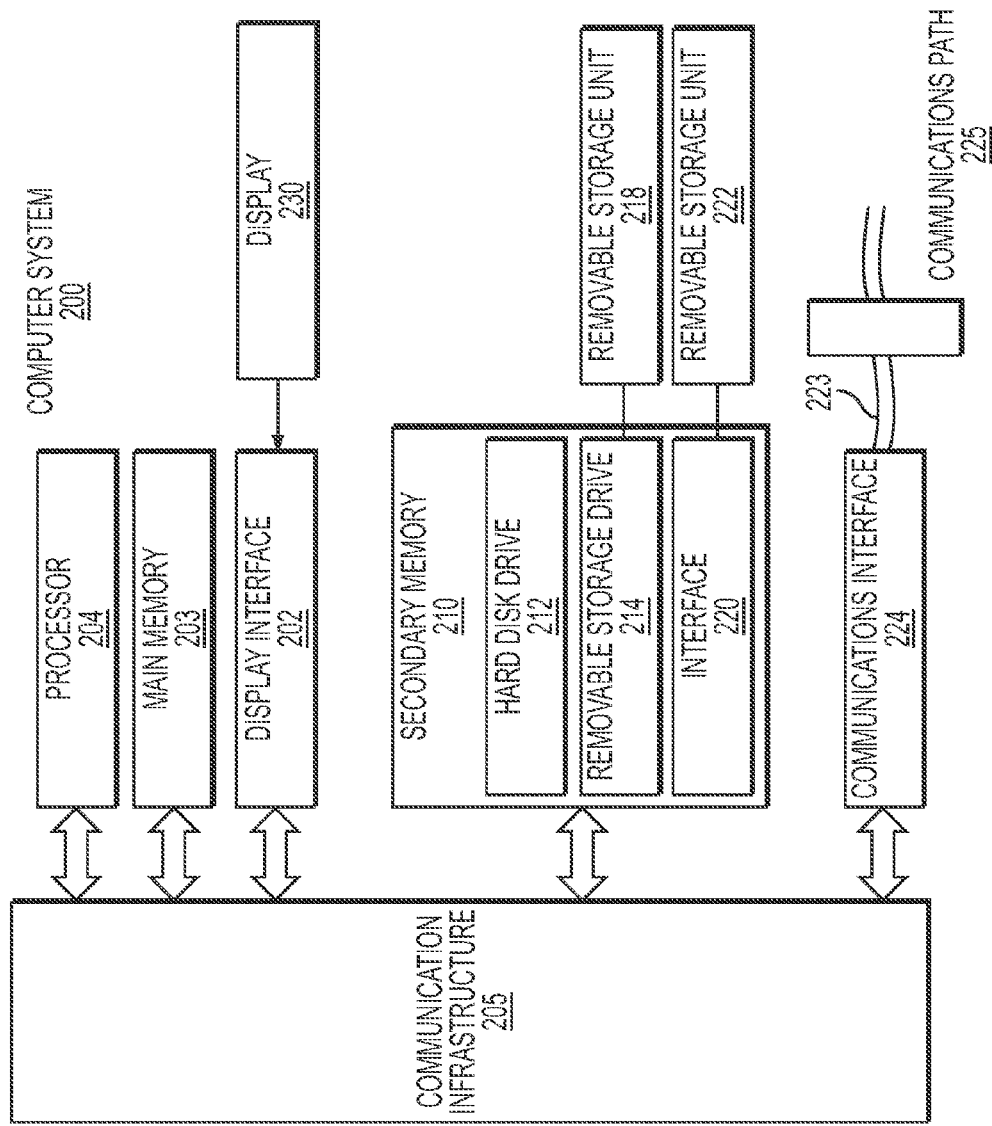
FIG. 10 is an example computer system capable of carrying out the functionality of an embodiment of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 10.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Example embodiments of the present invention have now been described in accordance with the above advantages. It will be appreciated that these examples are merely illustrative of the invention. Many variations and modifications will be apparent to those skilled in the art.

The invention claimed is:

1. A computer-implemented method for optimizing automated customer contact distribution services, the computer comprising at least one processor and a data repository operatively coupled to the at least one processor, the method comprising:
   selecting, via the at least one processor, a list of at least one customer to be contacted;
   forecasting, via the at least one processor, a best time to initiate contact with the at least one customer based on an account record of the at least one customer;
   placing an outgoing call to the at least one customer; and
   determining, via the at least one processor, whether the at least one customer answers the call;
   wherein, if the at least one customer does not answer the call, the method further comprises:
      inserting, via the at least one processor, a task in the account record to place a subsequent call to the at least one customer at a later time;
      updating, via the at least one processor, the account record with a telephone number and a designated time to attempt the subsequent call that is most convenient for the customer; and
      routing, via the at least one processor, the subsequent call to a selected agent according to the designated time.

2. The method of claim 1, further comprising the step of providing, via the at least one processor, a prompt to the selected agent based on at least one original purpose for contacting the at least one customer.

3. The method of claim 1, further comprising the step of forecasting, via the at least one processor, a best dial sequence for initiating contact with the at least one customer.

4. The method of claim 3, wherein the step of forecasting the best dial sequence further comprises ordering in sequence, via the at least one processor, a home phone number, a work phone number, and a cell phone number to be called based on the account record associated with the at least one customer.

5. The method of claim 1, wherein the list is obtained from a database comprising at least one customer associated with a delinquent collections account.

6. The method of claim 1, wherein the account record includes historical data reflecting a result of at least one prior call placed to the at least one customer.

7. A computer program product comprising a non-transitory computer usable medium having executable control logic stored therein for causing a computer having at least one processor to provide an optimal automated customer contact distribution service, the executable control logic comprising:
   computer-readable instructions for selecting a list of at least one customer to be contacted;
   computer-readable instructions for forecasting a best time to initiate contact with the at least one customer based on an account record of the at least one customer;
   computer-readable instructions for placing an outgoing call to the at least one customer;
   computer-readable instructions for determining whether the at least one customer answers the call;
   computer-readable instructions for, if the at least one customer does not answer the call, inserting a task in the account record to place a subsequent call to the at least one customer at a later time;
   computer-readable instructions for, if the at least one customer does not answer the call, updating the account record with a telephone number and a designated time to attempt the subsequent call that is most convenient for the customer; and
   computer-readable instructions for, if the at least one customer does not answer the call, routing the subsequent call to a selected agent according to the designated time.

8. The computer program product of claim 7, the executable control logic further comprising computer-readable instructions for providing a prompt to the selected agent based on at least one original purpose for contacting the at least one customer.

9. The computer program product of claim 7, the executable control logic further comprising computer-readable instructions for forecasting a best dial sequence for initiating contact with the at least one customer.

10. The computer program product of claim 9, wherein the executable control logic for forecasting further comprises computer-readable instructions for ordering in sequence a home phone number, a work phone number, and a cell phone number to be called based on the account record associated with the at least one customer.

11. The computer program product of claim 7, wherein the list is obtained from a database comprising at least one customer associated with a delinquent collections account.

12. The computer program product of claim 7, wherein the account record includes historical data reflecting a result of at least one prior call placed to the at least one customer.

* * * * *